Patented Oct. 3, 1922.

1,430,991

UNITED STATES PATENT OFFICE.

GUSTAVO BERNARD y HERNANDEZ, OF HABANA, CUBA.

PROCESS FOR MAKING BRICKS AND THEIR PRODUCTS.

No Drawing. Application filed September 27, 1920. Serial No. 413,158.

*To all whom it may concern:*

Be it known that I, GUSTAVO BERNARD Y HERNANDEZ, a citizen of the Republic of Cuba, and resident of Habana, Cuba, have invented certain new and useful Improvements in Processes for Making Bricks and Their Products, of which the following is a specification.

This invention relates to a process for making bricks and the product obtained thereby, and its main object is to provide a new process for making bricks whereby there is obtained a brick which is resistant to pressure and to high temperatures and which can absorb only a small quantity of water.

The process forming the subject matter of this invention consists of forming a solution of equal parts of tannic acid (tannin) and alum, thereby obtaining a mixture which is of higher astringent qualities than would result by using separately either one of said bodies by itself; adding said solution to a quantity of quick lime and to the pasty mixture thus formed is added fine gravel or sand, cement, such as Portland cement and scoria of coal. The mixture is mechanically pulverized in proper mills and is carried therefrom to the moulding machines where the bricks are formed and finally they are carried to the drying sheds where they are dried completely within a short time. A similar result can be finally obtained, without altering the quality of the brick, by first boiling the mixture of quick lime and solution of tannin and alum and adding in this hot condition the other elements, that is, the fine gravel, cement and scoria of coal, and effecting thereafter the pulverizing, moulding and drying operation.

If it is desired to obtain colored bricks it is only required to add the required coloring substance to the mixture previously to the pulverizing and moulding operation.

Having thus described my invention and the manner in which the same is carried out, what I claim is:

1. A process for making bricks which consists in forming a pasty mixture of quick lime and an astringent solution; adding to said mixture cement, fine gravel or sand and scoria of coal, pulverizing finely the resulting mixture, moulding it in brick shape and finally drying the same.

2. A process for making bricks which consists in forming a solution of equal parts of tannin and alum; and adding it to quick lime; adding to the resulting pasty mixture, cement, fine gravel or sand, scoria of coal and a coloring substance, pulverizing finely the resulting mixture, moulding in brick shape and finally drying the same.

3. A brick formed of a solution of tannin and alum, quick lime, cement, gravel or sand, and scoria of coal.

In witness whereof I affix my signature.

GUSTAVO BERNARD y HERNANDEZ.